(12) United States Patent
Ricketts et al.

(10) Patent No.: US 7,837,542 B1
(45) Date of Patent: Nov. 23, 2010

(54) CORN COB CLEANING SYSTEM

(75) Inventors: Jonathan E. Ricketts, Ephrata, PA (US); John J. Borsdorf, Leola, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/617,141

(22) Filed: Nov. 12, 2009

Related U.S. Application Data (60) Provisional application No. 61/216,521, filed on May 18, 2009.

(51) Int. Cl.
A01F 12/48 (2006.01)
B07B 1/55 (2006.01)
B08B 5/00 (2006.01)

(52) U.S. Cl. ..................... 460/99

(58) Field of Classification Search ............ 460/99, 460/96, 143, 115, 131, 145, 903, 102, 100, 460/79, 23, 114, 42, 44; 56/202, 16.6, 13.3; 15/340.4, 340.3
See application file for complete search history.

(56) References Cited

U.S. PATENT DOCUMENTS

| | | | | |
|---|---|---|---|---|
| 2,037,491 A | * | 4/1936 | Wagoner | 56/401 |
| 3,298,162 A | * | 1/1967 | Medd | 56/13.9 |
| 3,317,064 A | * | 5/1967 | Fingerut | 406/41 |
| 3,630,009 A | * | 12/1971 | Ashton | 56/11.9 |
| 3,705,483 A | * | 12/1972 | Jarrell et al. | 56/13.5 |
| 3,721,075 A | * | 3/1973 | Weiberg | 56/13.5 |
| 3,772,860 A | * | 11/1973 | Weiberg | 56/13.5 |
| 3,833,006 A | | 9/1974 | Temple | |
| 3,863,431 A | * | 2/1975 | Fowler | 56/502 |
| 3,952,889 A | | 4/1976 | Wanker et al. | |
| 3,962,072 A | * | 6/1976 | Ramacher et al. | 209/140 |
| 4,121,778 A | * | 10/1978 | Quick | 241/79 |
| 4,147,017 A | * | 4/1979 | Cortopassi et al. | 56/16.5 |
| 4,178,743 A | * | 12/1979 | Persoons et al. | 56/12.9 |
| 4,287,707 A | * | 9/1981 | Persoons et al. | 56/12.8 |
| 4,555,896 A | * | 12/1985 | Stiff et al. | 56/13.9 |
| 4,589,425 A | | 5/1986 | Mitchell, Jr. | |
| 4,642,977 A | | 2/1987 | Ramacher | |
| 4,677,813 A | * | 7/1987 | Stiff et al. | 56/13.9 |
| 4,759,680 A | * | 7/1988 | Simpson, III | 414/418 |
| 4,943,260 A | * | 7/1990 | Fossum | 460/96 |
| 5,001,893 A | * | 3/1991 | Stanley et al. | 56/328.1 |
| 5,042,240 A | * | 8/1991 | Rocca et al. | 56/16.6 |
| 5,193,331 A | * | 3/1993 | Quandt | 56/12.8 |

(Continued)

*Primary Examiner*—Árpád Fábián-Kovács
(74) *Attorney, Agent, or Firm*—Michael G. Harms; Patrick M. Sheldrake (57) ABSTRACT

A cleaning system for corn cobs incorporating a conveyor system providing a capability for positively removing or cleaning other crop residue from the cobs, which is adapted to be towed by a harvester; to be incorporated with a cob collecting device; and which can be adjustable for varying corn varieties, conditions and the like. The conveyor system includes at least one enclosed inclined conveyor for carrying a flow of the crop residue upwardly and propelling the flow into a space, while a flow of air is directed downwardly along the conveyor to remove other residue material from the cobs. Another flow of air is optionally directed downwardly through the space for removing additional material other than cobs, and at least one aspect of the system can be adjusted for relatively varying the air flows to adapt the system for a variety of conditions.

18 Claims, 12 Drawing Sheets

U.S. PATENT DOCUMENTS

| | | | |
|---|---|---|---|
| 5,228,279 A * | 7/1993 | McKenna et al. | 56/328.1 |
| 5,256,106 A | 10/1993 | Shrawder | |
| 5,421,147 A * | 6/1995 | Holden et al. | 56/328.1 |
| 5,558,576 A | 9/1996 | Meyers | |
| 5,930,987 A | 8/1999 | Urich et al. | |
| 5,941,768 A | 8/1999 | Flamme | |
| 6,272,819 B1 * | 8/2001 | Wendte et al. | 56/11.9 |
| 6,358,141 B1 | 3/2002 | Stukenholtz et al. | |
| 7,322,424 B2 * | 1/2008 | Kido | 171/17 |
| 7,413,507 B2 | 8/2008 | Weichholdt | |
| 2009/0095662 A1 | 4/2009 | Redekop et al. | |
| 2009/0104952 A1 | 4/2009 | Redekop et al. | |
| 2009/0124309 A1 | 5/2009 | Redekop et al. | |
| 2009/0137295 A1 | 5/2009 | Redekop et al. | |

* cited by examiner

CORN COB CLEANING SYSTEM

This application claims the benefit of U.S. Provisional Application No. 61/216,521, filed May 18, 2009.

TECHNICAL FIELD

This invention relates generally to a cleaning system for corn cobs, which device more particularly incorporates a conveyor system providing a capability for positively removing or cleaning other crop residue from the cobs, which is adapted to be towed by a harvester; to be incorporated with a cob collecting device; and which can be adjustable for varying corn varieties, conditions and the like.

BACKGROUND OF THE INVENTION

U.S. Provisional Application No. 61/216,521, filed May 18, 2009, is incorporated herein in its entirety by reference.

Presently, there is an increased demand for corn cobs as a feedstock for cellulosic ethanol, as well as other uses. As a result, there is heightened interest in collecting corn cobs during corn harvest. There is also concern by some that cob collection may reduce soil nutrient content. In this regard, crop residue or stover, e.g., corn stalks, leaves, husks and cobs, are traditionally left on the field after harvest, and break down over time to replenish soil nutrients. If a component of the stover, e.g., cobs is instead collected, nutrient levels could be lowered as a result. To mitigate this concern, some consider it desirable when collecting cobs, to collect only the cobs, with or without attached husks, and return the other residue or stover, referred to also as material other than cobs (MOC) to the field. Thus, it is sought to have a system for removing or cleaning MOC from cobs which can be adapted for operation in connection with a corn harvester, and which can be incorporated with a cob collection capability.

Numerous apparatus have been proposed for use in connection with cob collection devices, for cleaning or separating cobs from the other stover or MOC. To illustrate, prior to the early 1960's, the common corn harvesting practice involved picking the ears of corn in the field, removing husks from the ears, and transporting the ears still containing the corn kernels to a corn crib, and later shelling the corn off of the cobs at a stationary sheller. This harvesting procedure has been almost entirely replaced by modern self-propelled combine type harvesters, which separate and collect the corn kernels, and discharge the cobs and other stover onto the field.

Combines which harvest the corn and separate the kernels from the cobs and other stover or residue, then discharge the cobs and other stover onto the field, are now the industry standard. More recently, devices for collecting cobs discharged from combines have been developed. Several of such known devices have variously utilized a towed cart or wagon for receiving and holding the cobs, and a conveyor system for conveying the cobs from the combine to the cart or wagon. Some of the cob collection devices also include apparatus for separating the cobs from the other stover or MOC, mainly using air flow. Reference in this regard, Flamme U.S. Pat. No. 5,941,768, issued Aug. 24, 1999, which discloses a cob collection unit pulled behind a combine to collect on a first conveyor all the residue discharged from the combine, with a separation unit behind the conveyor including a second conveyor, and utilizing a fan to suck the stover from the cobs as they are released from the top of the second conveyor and to blow the stover back onto the field. Redekop et al. U.S. Patent Publication Nos. 20090095662 published Apr. 16, 2009; 20090104952 published Apr. 23, 2009; and 20090124309 published May 14, 2009, disclose a pulled cob collection unit, which utilizes a sequential series of inclined belt conveyors, and blower or suction fans for directing air upwardly through the discharged material as it falls from the upper end of one conveyor onto a lower end of the next conveyor, such that the heavier cobs are to continue to the next conveyor and the lighter stover or MOC will be carried upwardly by the air flow, with the cobs being conveyed into a collection tank by a further conveyor or conveyors, and the MOC to be directed by vanes sidewardly from the unit.

Reference also Stukenholtz U.S. Pat. No. 6,358,141 issued Mar. 19, 2002, and Redekop et al. U.S. Patent Publication No. 20090137295, which disclose cob collection systems on a combine which utilize on-board bins and cob separation using sieves on the combine itself.

A possible shortcoming of the above-discussed known cob cleaning devices and systems that direct air flows upwardly through falling cobs and MOC is that loose husks in the MOC, which are typically long and sinewy, can be retained by, and even wrapped around, the falling cobs, so as not to be cleaned or separated from the cobs. MOC contained in upwardly discharged air flows can also fall onto or into the adjacent cob collection device. And, when vanes or other apparatus are used for deflecting the MOC containing upward air flow sidewardly, they can become clogged if the air flow is not sufficiently strong or MOC is high in volume and/or moisture content. It is also difficult to distribute MOC over the swath of the cleaning device when the MOC is discharged upwardly or sidewardly.

Additionally, the above-listed known cob cleaning devices have only a limited or no ability to be configured differently for different conditions, such as the crop residue mixes of different corn varieties, e.g., percentage and/or size of MOC; harvester settings; yield; moisture content; and the like.

Thus, what is sought is a cob cleaning device or system, adaptable for operation in association with a harvester, and/or a cob collection device, which provides one or more of the capabilities, and overcomes one or more of the shortcomings, set forth above.

SUMMARY OF THE INVENTION

What is disclosed is a cob cleaning device or system, adaptable for operation in association with a harvester, and/or a cob collection device, which provides one or more of the capabilities, and overcomes one or more of the shortcomings, set forth above.

According to a preferred aspect of the invention, the corn cob cleaning system includes a corn residue conveyor system including at least one inclined conveyor having a lower first end configured and positioned for receiving a flow of corn residue including cobs mixed with other material, an opposite second end disposed higher than the first end and adjacent to a space, and a movable, upwardly facing surface extending between the first end and the second end and configured for carrying the flow of corn residue. At least a substantial portion of the upwardly facing surface of the inclined conveyor is contained in or covered by a housing or cover, defining a passage or duct thereover extending between a first opening adjacent to the first or lower end of the inclined conveyor and a second opening adjacent to the second or upper end of the conveyor. The inclined conveyor is operable for moving the upwardly facing surface for carrying the flow of corn residue upwardly through the passage to the second end, and propelling the flow of residue away from the inclined conveyor in an airborne manner into the space. The system includes a fan disposed generally above the upper end or region of the conveyor and the space, configured and operable to generate a continuous blast or flow of air downwardly through the passage or duct and over the upwardly facing surface of the conveyor. This flow of air will be discharged through the first opening adjacent to the lower end of the inclined conveyor, preferably largely through a gap through which the corn residue will flow as it is deposited onto the conveyor, for instance, from another conveyor, which can be, for instance, a belt type conveyor or an auger type. Alternatively, the flow can come directly from the harvesting machine. The remaining portion of the air flow downwardly over the inclined conveyor that does not exit through the gap can be discharged over the incoming residue flow. Optionally, a second blast or flow of the air will be directed downwardly through the space adjacent to the upper end of the conveyor.

The portion of the downward air flow that flows through the gap, will pass through the residue flow as it is airborne, to remove or clean loose elements of the residue or MOC from the cobs. The cobs, and remaining residue will them be carried upwardly by the inclined conveyor, while the air flows downwardly thereover. As this occurs, the downward air flow as well as the inclined orientation of the conveyor, will preferably combine to agitate the upwardly carried residue, such that additional loose elements of MOC will be freed, lifted, and carried in the reverse direction, downwardly by the air flow. This MOC will then be discharged at the lower end of the conveyor, through the gap, or other portion of the first opening. As a non-limiting example, it has been found that the cleaning that occurs as the residue crosses the gap can remove or clean in a range of 60 to 70 percent of the loose MOC from the cobs, with more cleaned as the flow progresses up the inclined conveyor.

The second flow of air will remove additional MOC as the residue, now mainly cobs, flows through the space adjacent to the end of the inclined conveyor. In this regard, the characteristics of the downward flow of air through this space will be selected so as to remove lighter elements of the residue, e.g., husks and leaves and fragments thereof, while allowing the heavier cobs to continue through the space. As such, a triple cleaning action is effected by the air flows, first as the corn residue crosses the gap at the lower end of the inclined conveyor, second as the remaining corn residue is carried up the inclined conveyor, and third, as the residue is propelled by the inclined conveyor through the space adjacent to the upper end of the conveyor.

According to another preferred aspect, the inclined conveyor is configured to be adjustable for relatively varying portions of the air flow output contained in the first air flow and the second air flow, respectively. For instance, an angle of inclination of the inclined conveyor can be varied for relatively varying the portions of the air flow output. As an example here, increasing the angle of inclination can increase the agitation action of the residue therealong, and decreasing the angle in combination with an air flow directed more at the conveyor can also increase agitation. The shape and angle of the housing or cover can also be varied, to effect different air flow characteristics, e.g., velocity, volume, rate, angle of attack, over the upwardly carried residue flow, to provide desired cleaning characteristics, e.g., agitation. As a non-limiting example in this regard, the housing or cover can have a curved shape that extends downwardly and away from the inclined conveyor so as to open up toward the lower end.

According to another preferred aspect, the operation of the fan will generate an air flow output, and the fan is configured to be adjustable for relatively varying portions and/or characteristics of the air flow output contained in the first air flow and the second air flow, respectively. As one example, the fan is supported to be movable for varying or dividing the portions of the air flow output comprising the flow of air down the inclined conveyor and the second flow of air, and can include support structure configured to allow movement of the fan and/or fan housing, vertically and horizontally, and also angularly or rotationally, for varying the height of the air flow downwardly over the inclined conveyor, and dividing a portion of the air flow from the main flow for flow downwardly through the space. An angle or direction of the air flow can also be varied, for achieving desired cleaning characteristics.

As a non-limiting example in the above regard, some varieties of corn will have cobs that retain more of the husk after processing by the harvester, so that there is greater danger that the air flow down the inclined conveyor will pick up those cobs from the conveyor and carry them through the gap so as to be lost. This can be avoided by raising the level of the downward air flow over the inclined conveyor. In other instances, in contrast, a greater agitation of the residue flow over the cobs may be advantageous for freeing loose husks and other MOC from the cobs. In some instances also, the variety of corn harvested may allow the angle of inclination of the conveyor can be reduced, and the first flow of air directed more downwardly toward, e.g., at more of an intersecting angle to, the upward end of the upwardly facing surface of the inclined conveyor, to effect more agitation of the residue flow at that location to pick up more loose MOC, which will be facilitated by the shape and consistency, e.g., light weight, elongate paper-like strips and fragments, of the husks and leaves.

The inclined conveyor can also have a slatted surface, which facilitates the upward carrying capability of that conveyor, and also tumbling and agitation of the residue in cooperation with the flow of air directed thereagainst or thereover, which may be desirable for some varieties of corn or conditions. Essentially in this regard, any residue on the conveyor that extends above the height of a slat carrying it up the incline will have a tendency to tumble or fall over the slat, facilitated by the downward air flow or blast, and if light enough, e.g., not a cob, to be carried downwardly by gravity and the air flow. If a cob, this tumbling action may expose additional MOC to the air flow for removal thereby.

According to another preferred aspect, a cob collection device is disposed across the space from the second end of the inclined conveyor and includes an internal chamber configured for receiving the cobs. And, the cob collection device and the at least one inclined conveyor can be carried on a trailer configured to be towed by a corn harvester.

According to still another aspect of the invention, one or more additional conveyors can be provided, including a conveyor disposed adjacent to the first opening and configured for delivering the flow of corn residue to the lower end of the inclined conveyor. This conveyor can also be adjustably movable for altering flow of the removed material outwardly through the first opening, and for adjusting the gap between this conveyor and the inclined conveyor, through which the corn residue is propelled or falls, and a portion or all of the first air flow can be directed downwardly through this gap to remove additional residue from the cobs by passage therethrough. In this latter regard, by reducing the size or height of the gap, and restricting air flow through other outlets such as the space above the feeding conveyor, greater air flow velocity through the gap may be achieved, if desirable or advantageous for cleaning purposes.

As still another feature of the invention, when the invention is used in association with a harvester moving through a field, the downward flows of removed residue can be directed directly onto the field within the swath of the system or harvester, or spread to a desired sideward extent.

DETAILED DESCRIPTION OF THE INVENTION

Figure 1:
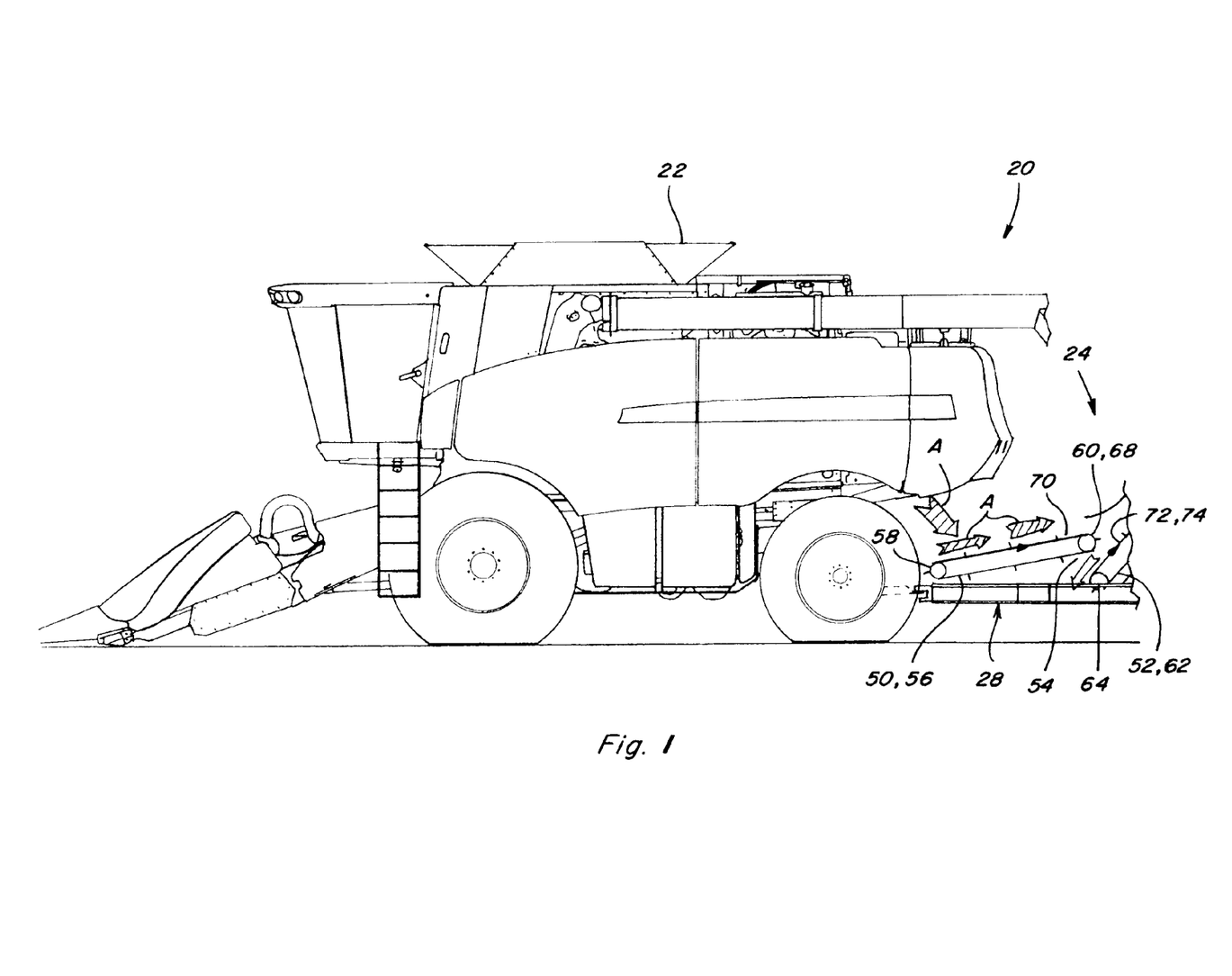
FIG. 1 is a fragmentary side view of a representative agricultural harvesting machine, shown towing a cob cleaning system according to the invention, illustrating operation thereof with arrows.
Figure 2:
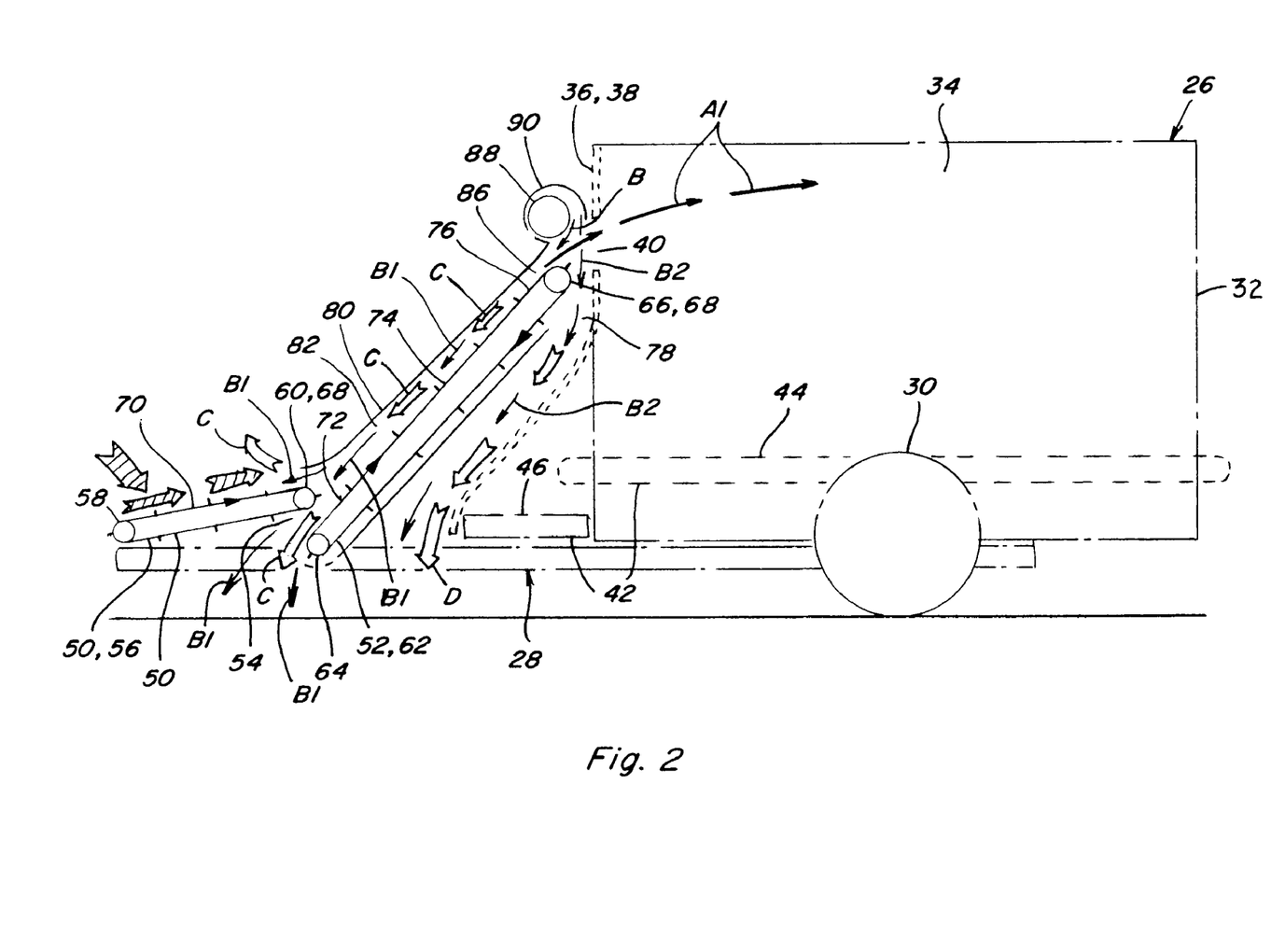
FIG. 2 is a simplified side view of the cob cleaning system, illustrating the operation thereof with arrows.

Referring now the drawings, in FIG. 1, a representative agricultural harvesting machine 20 is shown, which is a combine constructed and operable in the well known manner for harvesting whole ears of corn from corn plants as the combine travels over a field. Combine 20 includes well known apparatus (not shown) that gathers and conveys the ears of corn into a threshing system within the combine which removes most of the husk surrounding the ears, and the corn kernels from cobs of the ears, and directs a flow of the cobs, fragments thereof, and other residue or stover, all as generally denoted by arrow A, from the rear of machine 20. A grain cleaning system within machine 20 can also contribute residue to outward flow A. Also in the well known manner, the corn is collected and conveyed into a clean grain tank 22 on combine 20, or other receiver.

Referring also to FIGS. 2 through 12, a cob cleaning system 24 is shown, constructed and operable according to the teachings of the present invention, for receiving the flow of residue A, cleaning or removing at least a portion of the MOC from the cobs, and conveying the clean cobs to a cob collection device 26. Cleaning system 24 and collection device 26 are shown here supported on a trailer 28, which is configured to be towed by machine 20 while harvesting. Trailer 28 is constructed of suitable material such as structural steel and is shown supported by wheels 30, although it is likewise contemplated that tracks could be used, and that either could be powered, as desired or required for a particular application. As another alternative, cob cleaning system 24 could be incorporated into the structure of the harvesting machine with which it is used, e.g., combine 20, self-propelled, or otherwise moved in a manner adequate for receiving a flow of cobs from the harvesting machine.

Briefly addressing cob collection device 26, it generally includes an upstanding wall structure 32 of sheet metal or other suitable material bounding an interior cavity or chamber 34 adapted for receiving and holding a quantity of cobs. Upstanding wall structure 32 includes a front wall 36, having an upper region 38 including an aperture 40 therein, through which the cobs are received from cleaning system 24, as will be explained. Cob collection device 26 also includes suitable cob unloading apparatus 42, which here includes a floor conveyor 44 in the bottom of chamber 34, configured and operable for conveying cobs contained therein to the front of the chamber, and a cross conveyor 46 for receiving the cobs and conveying them sidewardly from device 26. This operation will be performed as desired or required during and/or after harvesting.

Cob cleaning system 24, as noted above, is configured and operable for receiving flow A of residue which will include cobs and MOC, including husks (both attached and unattached to cobs), leafs, stalks, and fragments of all of these, and removing or cleaning at least a substantial portion of the MOC from the cobs, and conveying the cleaned cobs into cob collection device 26, on a continuous basis, as machine 20 is harvesting corn from a field. System 24 includes a corn residue conveyor system comprised of a series of conveyors extending essentially from the rear of machine 20 to aperture 40 of cob collection device 26, here including a first conveyor 50 configured and operable receiving flow A, and conveying the flow rearwardly to a second conveyor 52 of system 24. Second conveyor 52 is inclined upwardly from conveyor 50, and is shown here separated therefrom by a gap 54, which is important for cleaning purposes, as will be explained. Conveyors 50 and 52 shown are each belt type conveyors, conveyor 50 having an endless slatted belt 56 encircling rollers 58 and 60, and conveyor 52 having an endless slatted belt 62 encircling rollers 64 and 66. Alternatively, conveyor 50 can be an auger or other type conveyor.

Conveyors 50 and 52 are suitably powered by drives 68 for moving belts 56 and 62, respectively, here drives 68 comprising fluid motors connected in rotatably driving relation to rollers 60 and 66, respectively, although electric motors, belts, chains or other suitable drive apparatus could alternatively be used.

Belt 56 of conveyor 50 has an upwardly facing surface 70 which, during operation, carries flow A rearwardly, and propels the flow into gap 54 toward a lower first end 72 of conveyor 52. Belt 62 of conveyor 52 has an upwardly facing surface 74 extending upwardly to a second end 76, and in operation will be moved to carry that portion of flow A that reaches conveyor 52 upwardly, and propel it into a space 78.

Inclined conveyor 52 is contained in a housing of sheet metal or other suitable construction 80 which bounds and defines a passage 82 extending upwardly from a lower, first opening 84 to a higher second opening 86 in connection with space 78. Inclined conveyor 52 is operable for moving the upwardly facing surface 74 for carrying flow A upwardly through passage 82 and propelling it in an airborne manner into space 78.

Cleaning system 24 includes a fan 88 disposed in a fan housing 90 generally above space 78. Fan 88 here is depicted as a centrifugal type fan of conventional, well known construction, having an elongate, hollow cylindrical shaped impeller with a plurality of blades therearound extending sidewardly and having a length about equal to the width of conveyor 82. Fan 88 is rotatably driven by a suitable drive 92

(FIG. 4), for generating a continuous blast or flow of air B outwardly through a discharge outlet 94.

As illustrated in FIGS. 2, 3, 4 and 5, flow of air B is directed toward second end 76 of inclined second conveyor 52, so as to be divided into a first flow of air B1 directed downwardly into passage 82 through second opening 86, and a second flow of air B2 directed downwardly through space 78. First flow of air B1 will flow downwardly through passage 82, over the upwardly moving flow of residue material A, and preferably will be sufficient in velocity and flow volume for lifting and reversing the direction of at least some of the loose MOC carried by the conveyor, as denoted by arrows C, from the cobs, without picking up a significant number of the cobs. This MOC flow C will then be discharged from passage 82 through first opening 84, preferably mainly through gap 54, that is, through incoming residue flow A, with some flow exhausted above conveyor 50.

Flow B1 through gap 54 is important as it will remove or clean a substantial portion of the MOC from the crossing flow A, so as to comprise a substantial or main part of the cleaning action. Additionally, flow A will preferably be further cleaned as it is carried upwardly by conveyor 52, such that as it progresses up conveyor 52, it will transition to a consistency of mostly cobs, as denoted by arrows A1. Flow A1 (now mostly cobs) will be propelled by conveyor 52 from opening 86 into space 78, where downwardly directed flow of air B2 will pass through it, to remove additional MOC, such that flow A1 will be further cleaned and will pass through space 78 and aperture 40 into chamber 34 of cob collection device 26. Flow of air B2 after passage through flow A1 now also contains MOC, and will flow downwardly through a lower portion of space 78 to the ground below trailer 28.

Thus, system 24 is capable of performing a triple cleaning of flow A, first and mainly as it crosses gap 54 and thereafter continually as it is carried upwardly by inclined conveyor 52 through passage 82, and as it crosses space 78 into collection device 26. Additionally, inclined conveyor 52 and fan 88 can be cooperatively configured and operated so that the air flow over conveyor 52 will be essentially laminar, so as to have only minimal cleaning effect, which may be desired for some instances, such as for varieties of corn or other conditions resulting in cobs including a large amount of attached husks which can be lifted by too close and/or too powerful of an air flow.

Alternatively, for corn varieties and conditions wherein the cobs contain fewer attached husks, and more loose husks, leaves, etc., more agitation of the flow A over conveyor 52 may be desirable for more aggressive cleaning at that location. In this regard, the angle of the conveyor, and characteristics of air flow B1 can be tailored for agitating the residue flow A, e.g., tumbling action, to expose the loose elements of residue, e.g., husks, leaves and the like, more to the air flow, so that those elements will be removed and lifted and carried away in the opposite direction, but not a significant number of the cobs. Flow of air B2 downwardly through space 78 will be selected so as to remove lighter elements of the residue, e.g., husks and leaves and fragments remaining in flow A1, as demoted by arrows D, while allowing the heavier cobs to continue through space 78. As such, as a general rule, air flow B1 down inclined conveyor 52 will typically be desired to be the more powerful or aggressive of the air flows and will perform most of the cleaning function.

Figure 3:
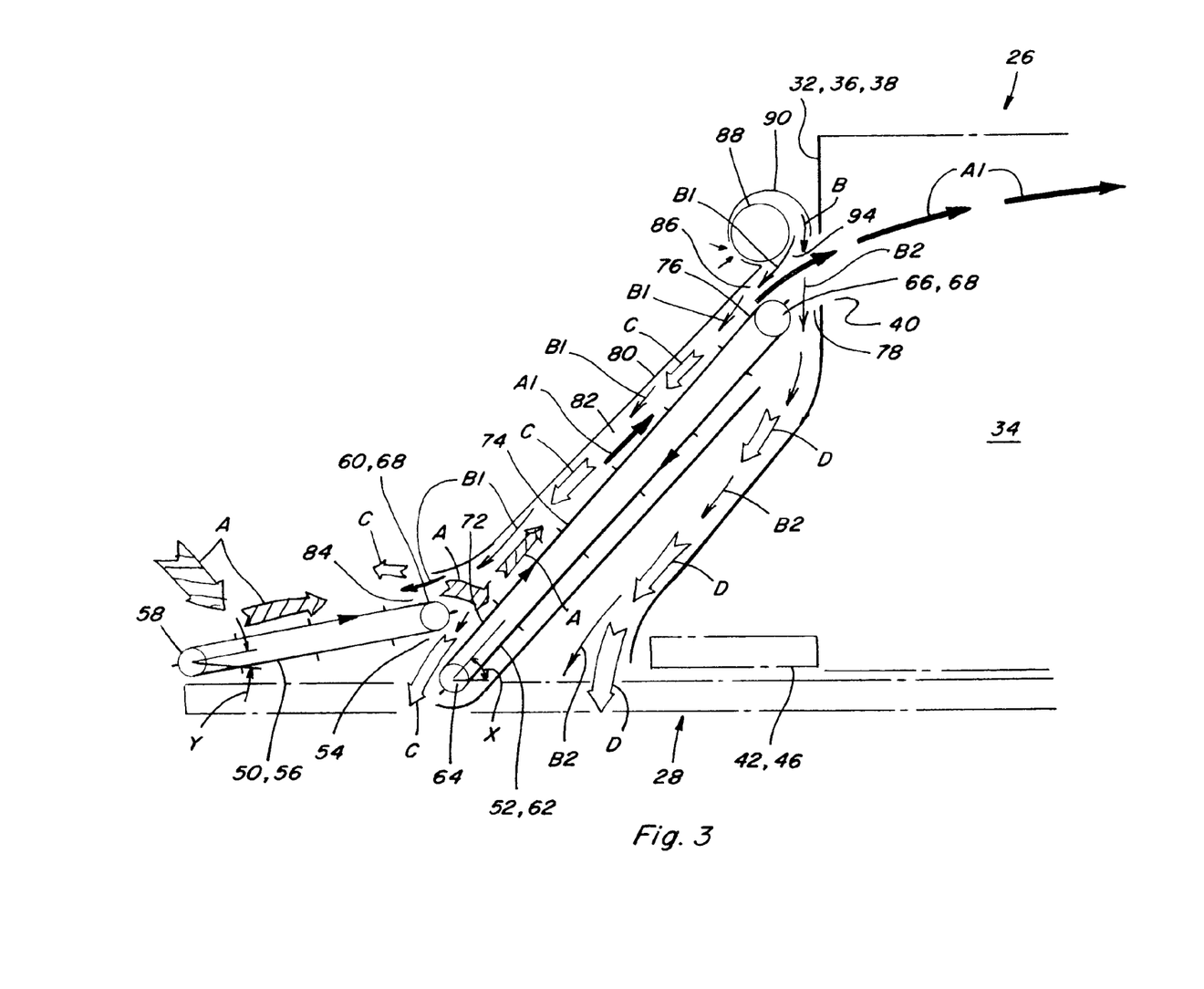
FIG. 3 is an enlarged simplified fragmentary side view of the cob cleaning system, showing operation thereof.
Figure 4:
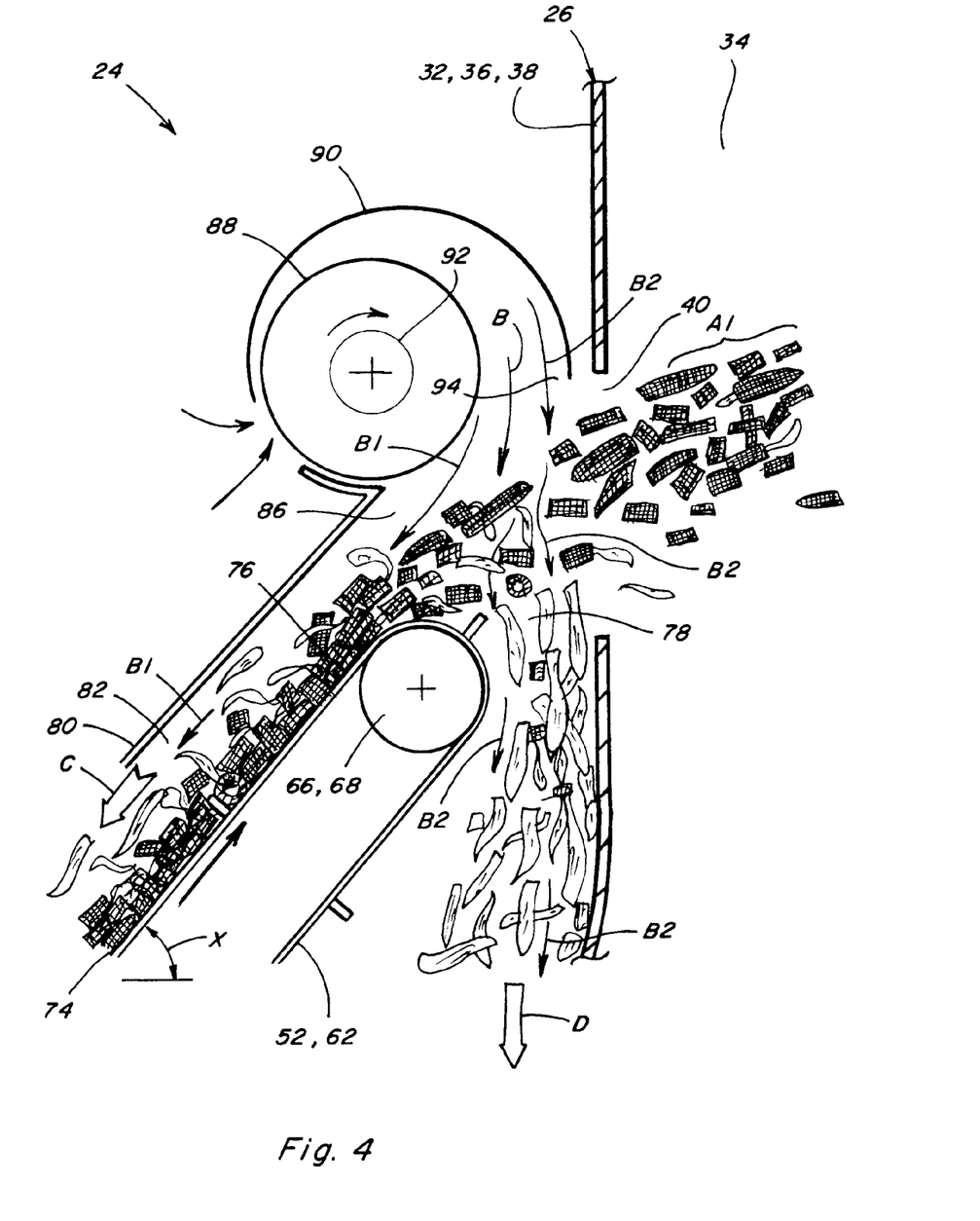
FIG. 4 is still another simplified side view of the cob cleaning system, showing operation of aspects thereof for removing corn residue from cobs.
Figure 5:
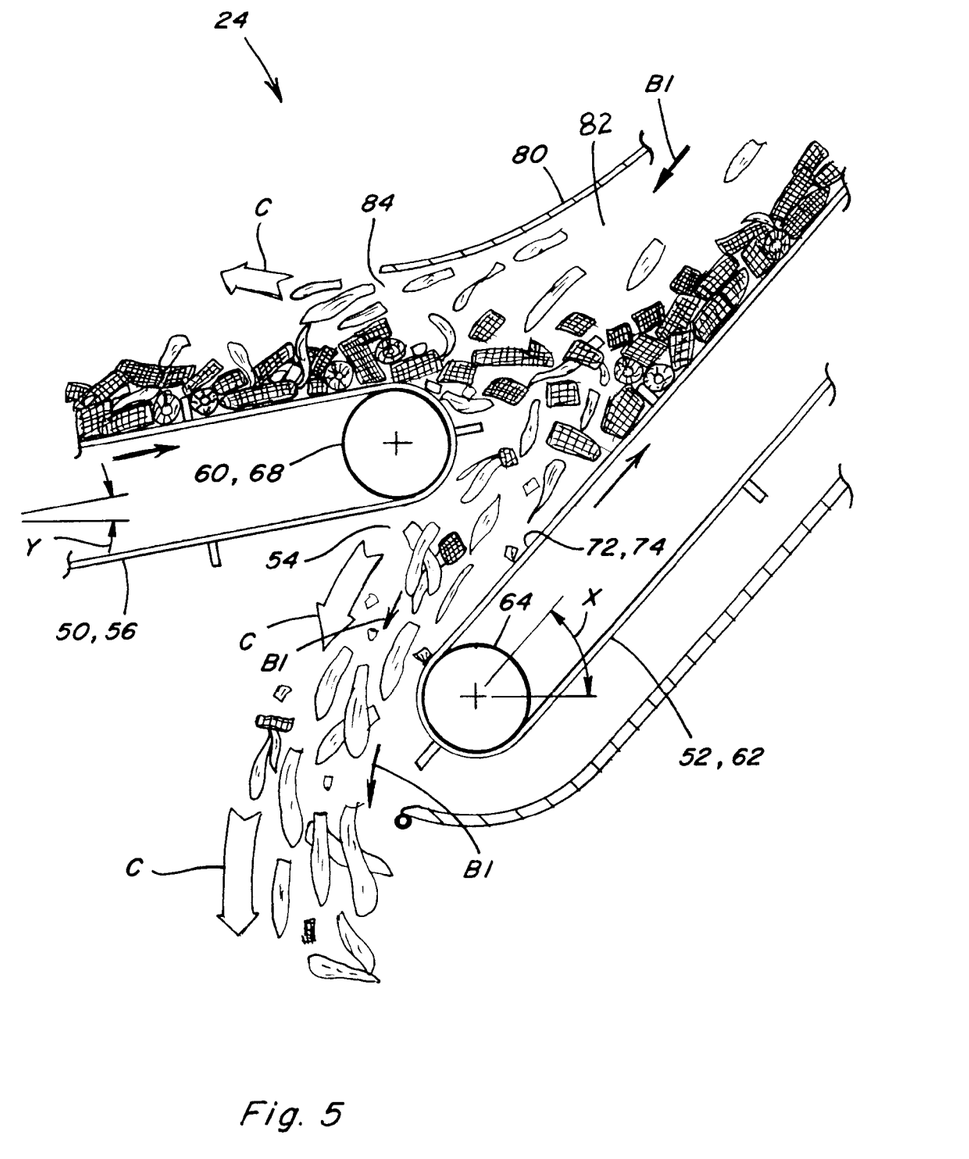
FIG. 5 is still another simplified side view of the cob cleaning system, showing operation of other aspects thereof.

As illustrated in FIGS. 3, 4 and 5, the angle of inclination X of conveyor 52 will preferably be relatively steep, e.g., greater than 30 degrees or so, and as much as 60 degrees or so relative to horizontal, for several reasons, including to reduce the overall length of the cleaning system, and to provide a desired trajectory for the airborne flow A1 of mostly cobs across space 78 and into collection device 26. In this latter regard, the speed of movement of the belt of conveyor 52 in combination with the angle of inclination can be selected to propel the cobs of flow A1 a distance which can be as much as about the length of cob collection device 26, to achieve desired distribution of the cobs therein.

Figure 12:
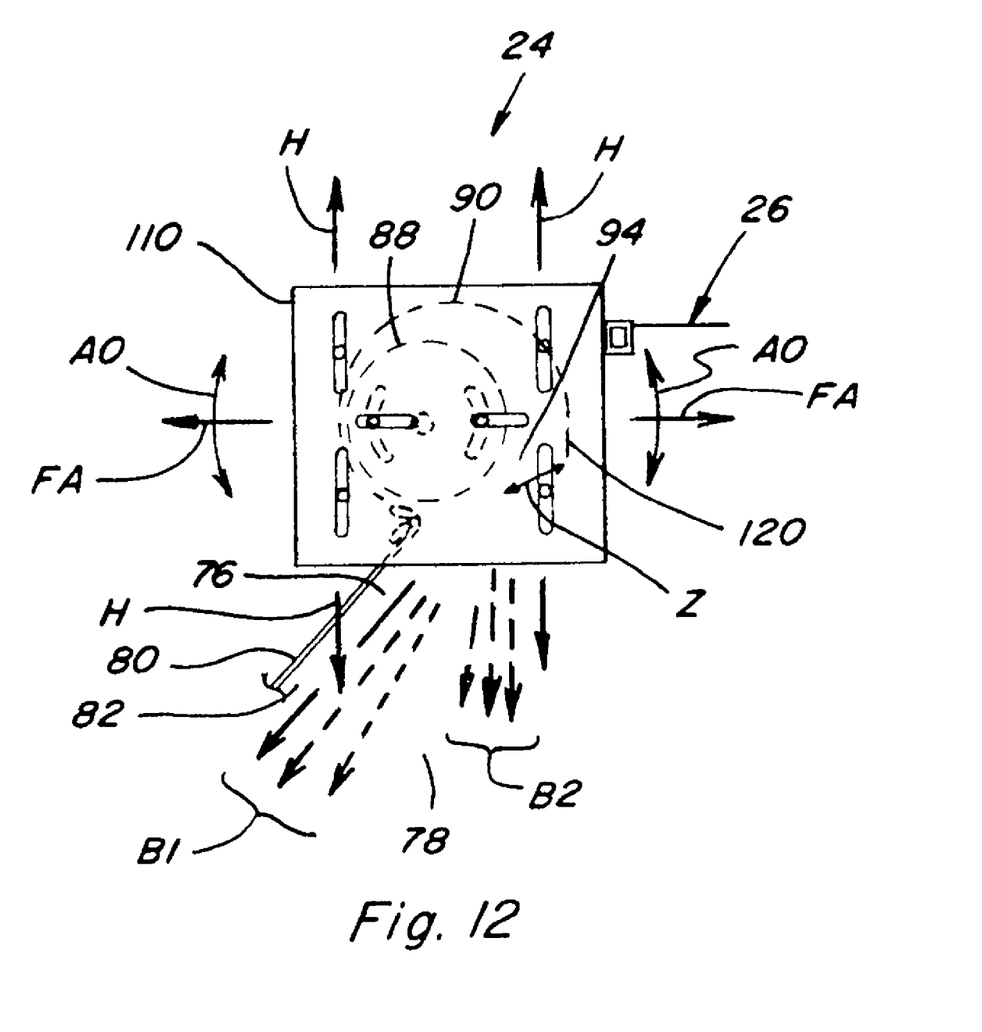
FIG. 12 is still another side view showing adjustability of the fan and effects on operation of the system.

Further, it has been found to be advantageous for a variety of reasons, to have a capability for varying characteristics of flows of air B1 and B2, for varying or improving the cleaning effect achieved, and for accommodating different conditions, such as different corn varieties; volume, including relative amounts of cobs and MOC; cob sizes; crop yields; moisture content; and the like, particularly to reduce cob loss. This is accomplished according to the invention, by providing a capability for varying the angle of inclination X of conveyor 52; an angle of inclination Y of conveyor 50 (FIGS. 3, 4 and 5); and fore and aft position, denoted by arrows FA; height, denoted by arrows H; and angular orientation, denoted by arrows AO, of fan housing 90 and fan 88, as shown in FIG. 12. Additionally, the shape of housing 80 above conveyor 52 can be varied as illustrated in various of the FIGS for achieving a desired cleaning effect and controlling cob loss.

Referring more particularly to FIGS. 6 through 11, as one manner to provide the capability to vary the angle of conveyors 50 and 52, those conveyors can be pivotable about suitable points, such as pins or shafts 96 and 98 through the axes of rotation of rollers 58 and 64, respectively. Pins or shafts 100 and 102 movable within arcuate slots 104 and 106, respectively, can be fixed to housing 80 for fixing the conveyors in desired angular orientations, for instance using nuts 108 threadedly engageable with threaded ends on shafts 100 and 102, respectively. Alternatively, the position of conveyor 50 and/or conveyor 52 can be varied and held in position using a powered actuator, such as a fluid cylinder or cylinders (not shown).

Figure 11:
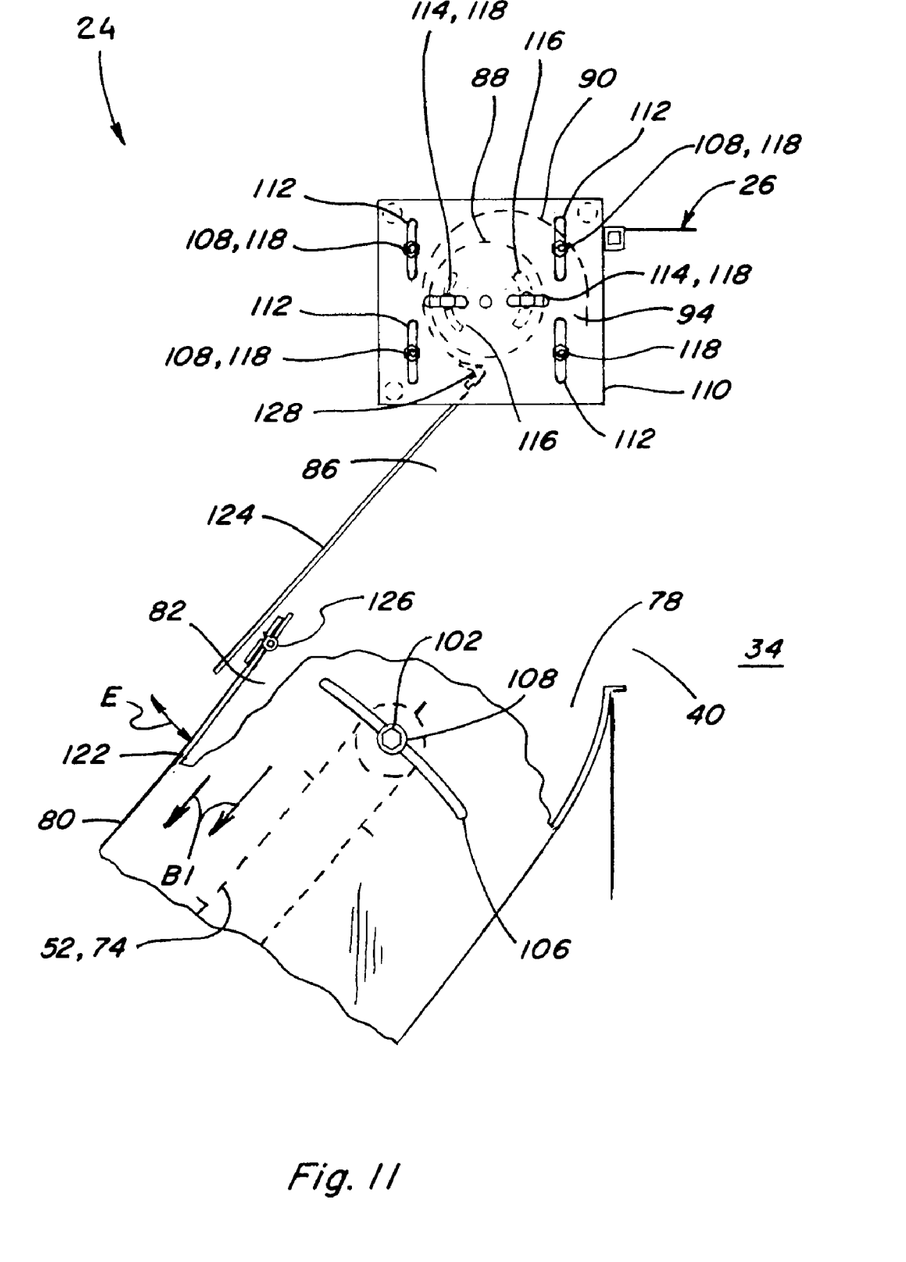
FIG. 11 is another side view showing adjustability of a fan of the system.

Similarly, as best illustrated in FIG. 11, the position and orientation of fan housing 90 can be varied and held, using a positioning plate 110 mounted on housing 80 and having vertical slots 112, horizontal slots 114 and optionally, arcuate slots 116, through which pins 118 attached to fan housing 90 are received, and suitably fixed in position, for instance, by nuts 108 threaded thereon.

Figure 6:
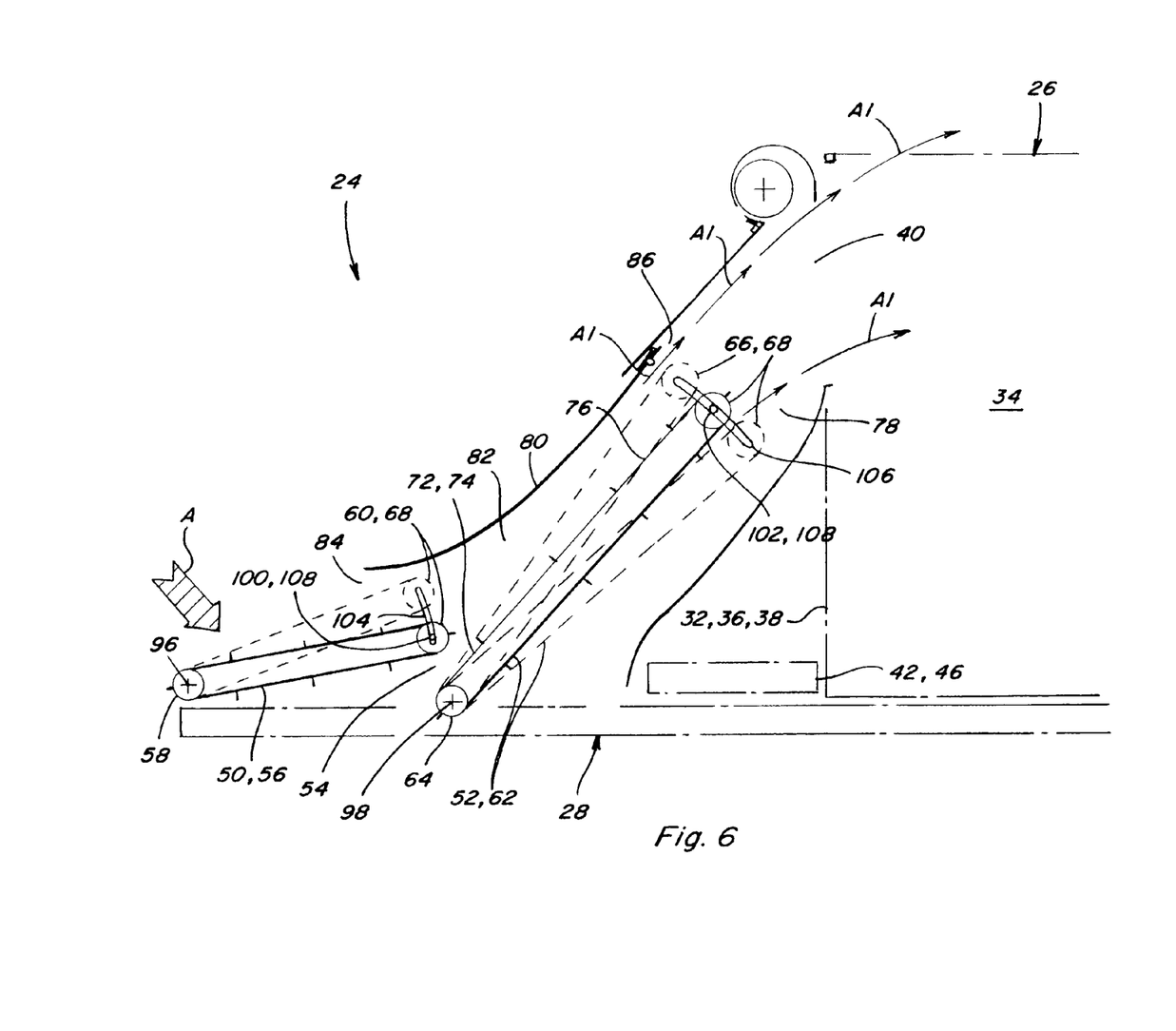
FIG. 6 is a simplified schematic side view of the system, showing adjustable aspects of conveyors thereof.
Figure 7:
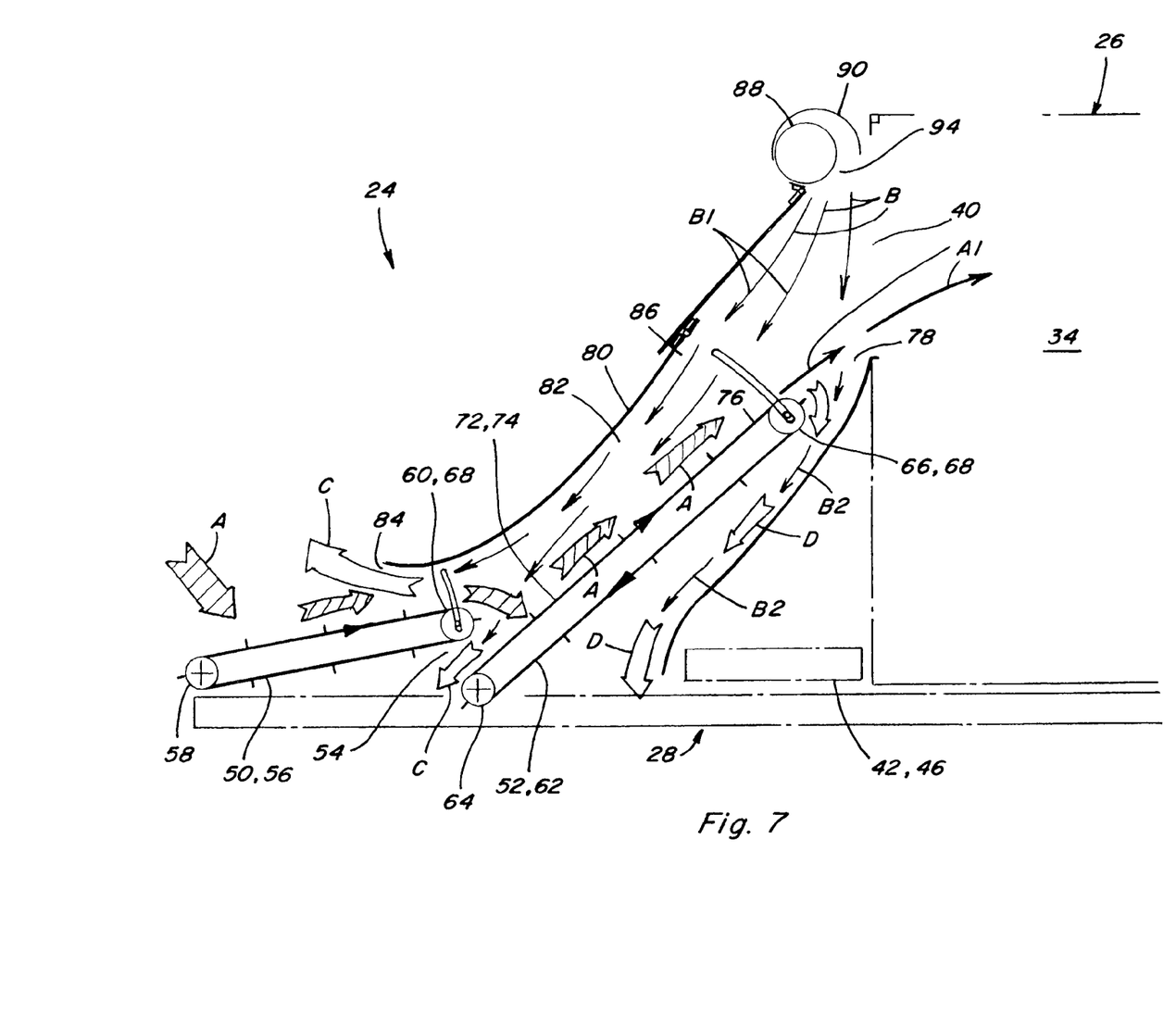
FIG. 7 is another simplified schematic side view, showing the conveyors adjusted differently and effects on operation of the system.
Figure 8:
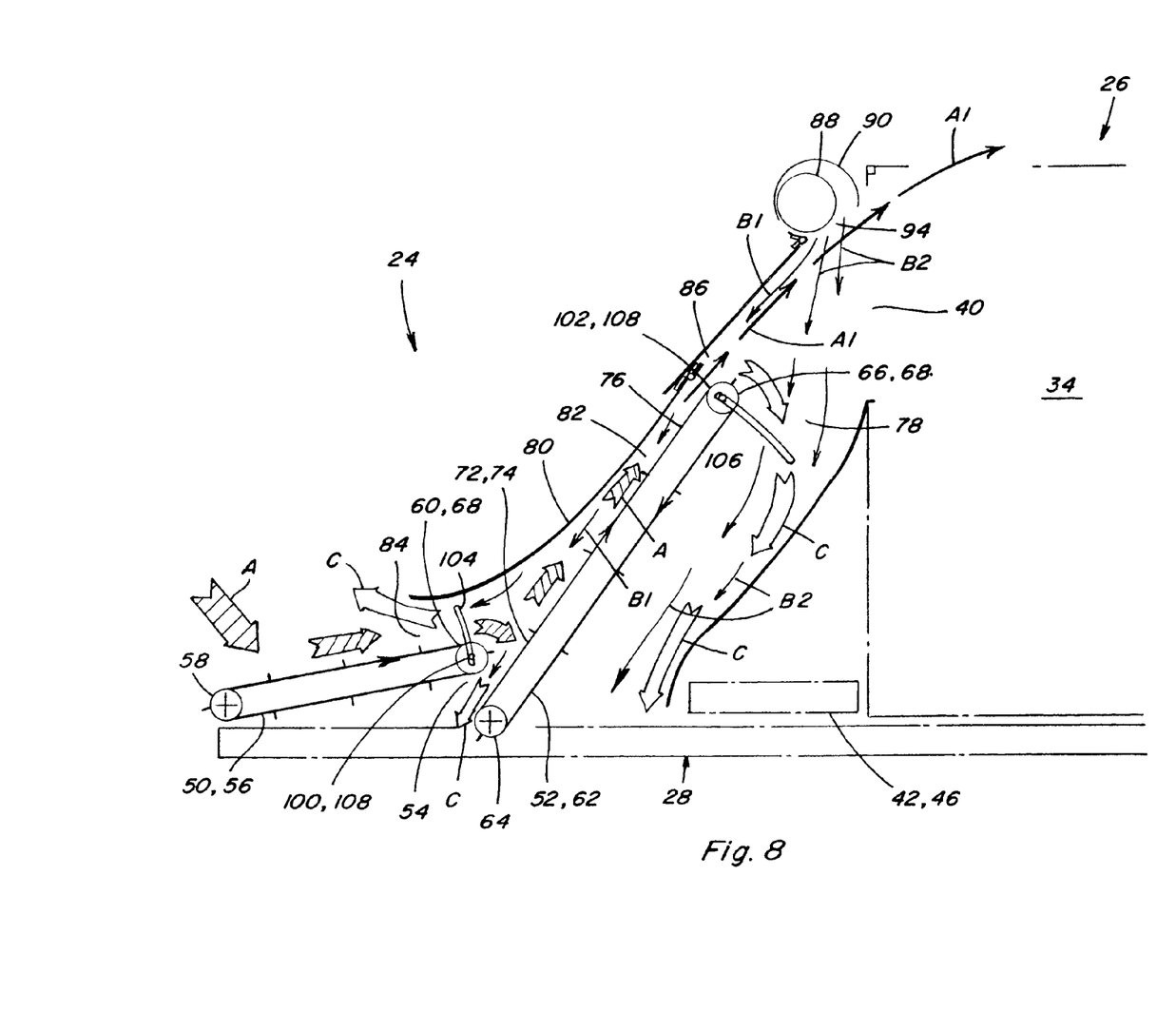
FIG. 8 is another simplified schematic side view, showing the conveyors adjusted differently and effects on operation.

As illustrated in FIG. 6, a relatively wide range of angles of inclination of both conveyors 50 and 52 (as illustrated by conveyors 50 and 52 in dotted lines) can be provided for varying the sizes of gap 54 and second opening 86, respectively. Typically, a gap 54 of 12 inches or greater is desired. As illustrated in FIG. 7, gap 54 can be made relatively small by positioning conveyor 50 at its lowest position. This can serve to reduce air flow through gap 54 to reduce cob loss, and to also possibly increase cleaning action in the areas over conveyor 52. Conveyor 52 is also illustrated in its lowest position, which opens up the upper end of passage 82 and second opening 86 such that most of air flow B will be directed over conveyor 52 as air flow B1, and passage 82 will be larger in volume. In FIG. 8, conveyor 50 is shown in its lowest position to minimize gap 54, and conveyor 52 is in its highest position, which can serve to reduce air flow B1 increase flow B2, such that more cleaning can be done in space 78, which will also increase MOC flow C beneath conveyor 52. The size of passage 82 is reduced also, which may increase the velocity of flow A1.

Figure 9:
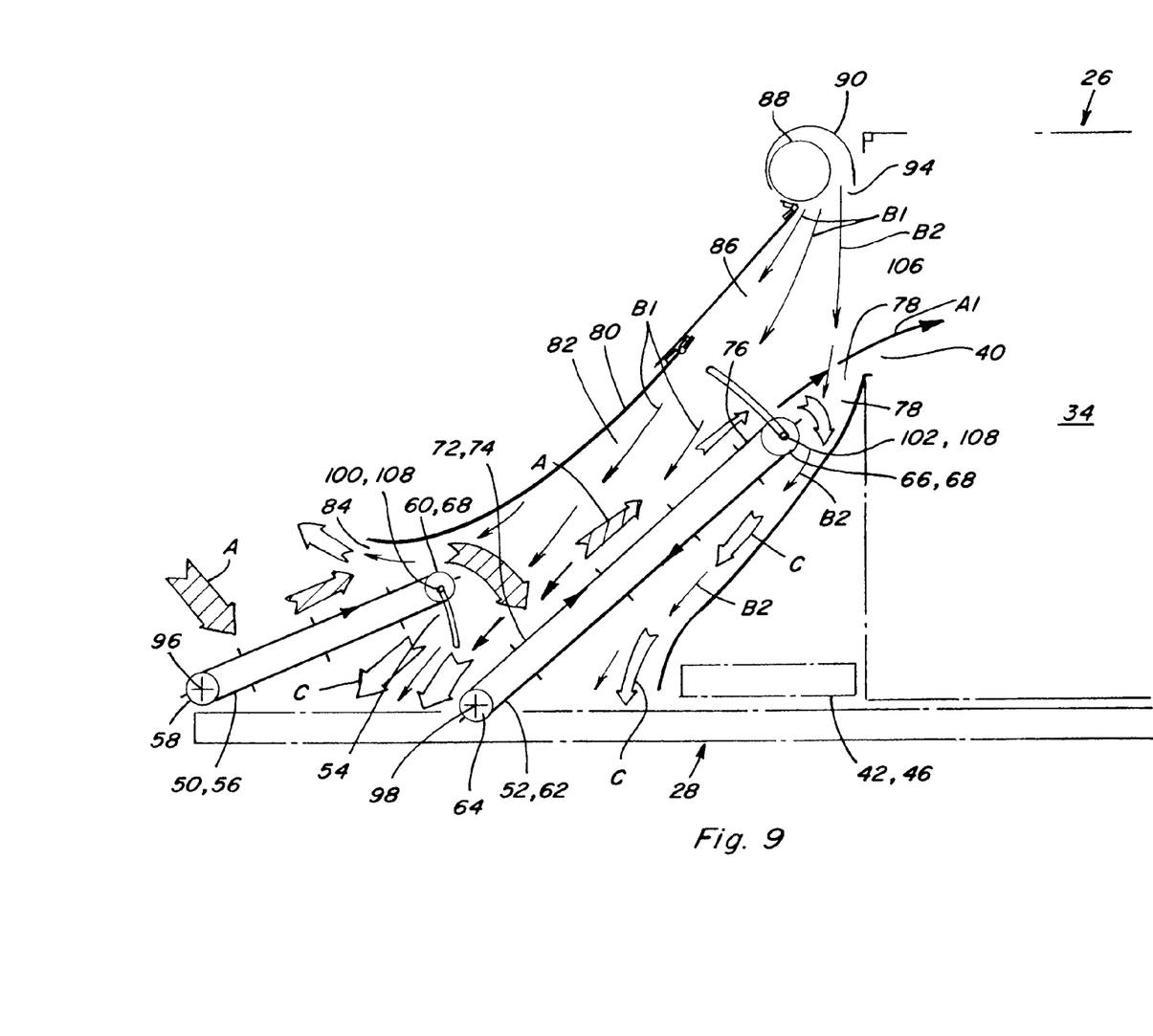
FIG. 9 is still another simplified schematic side view, showing the conveyors adjusted differently and effects on operation.
Figure 10:
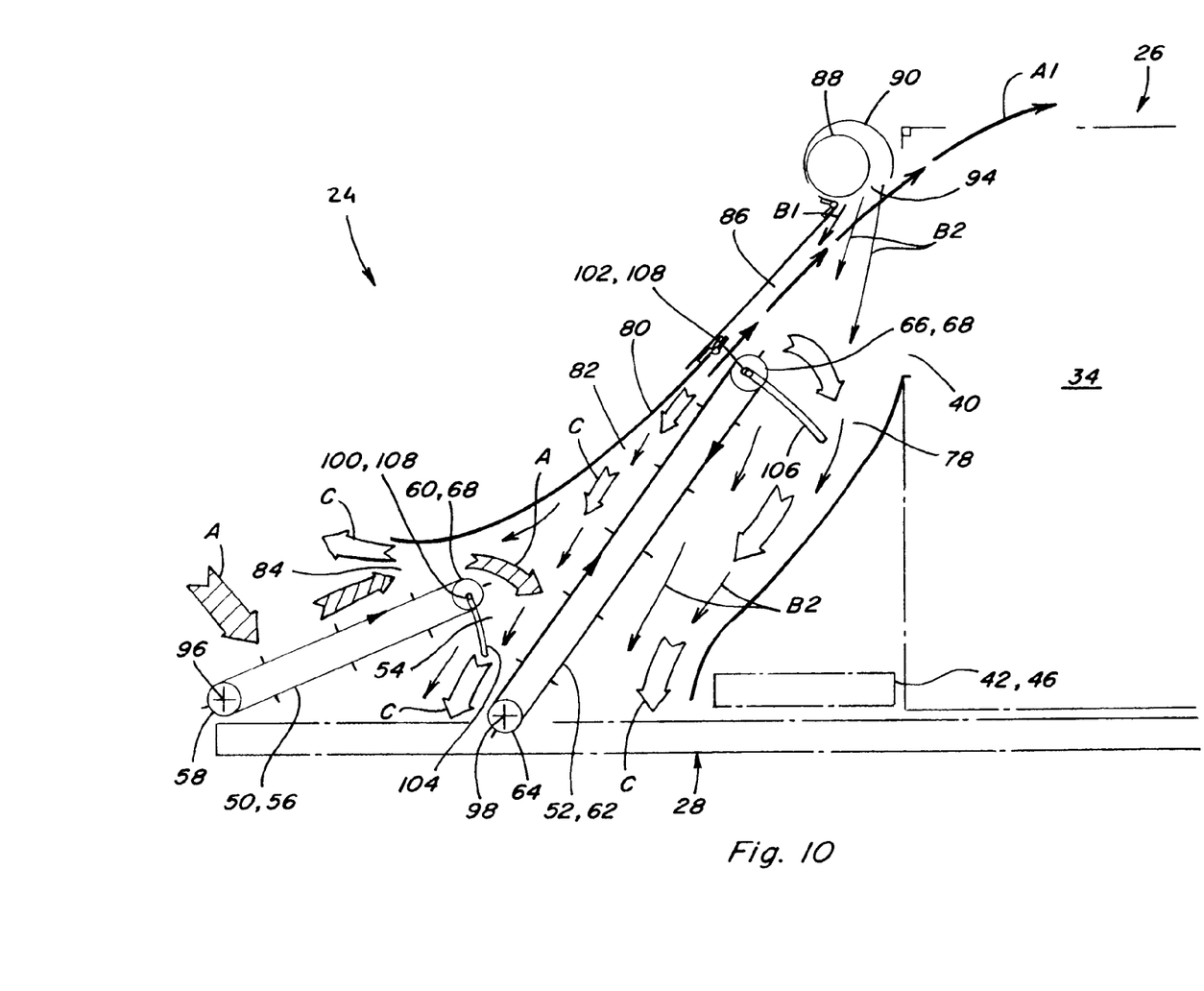
FIG. 10 is still another simplified schematic side view, showing the conveyors adjusted differently and effects on operation.

In FIG. 9, conveyor 50 is in its highest position and conveyor 52 is in its lowest position, such that the air flow B1 be larger than flow B2, and will flow through mostly through gap 54 with more flow C discharged at that location. In FIG. 10, both conveyors 50 and 52 are in their highest positions, such that gap 54 is large, and flow A1 will be directed closer to outlet 94 of fan 88 such that flow A is more concentrated at this location and most of air flow B will be directed downwardly as flow B2.

As evidenced by the arrows in FIGS. 11 and 12, elevating fan housing 90 can raise flow B1 relative to upwardly facing surface 74 of conveyor 52, so as to be more parallel or laminar in relation thereto, which will cause less agitation and can result in less cob loss from the conveyor, whereas lowering the fan can result in greater interaction of air flow B1 with residue flow on the conveyor. Rotation of fan housing 90 will reorient leading edge 120 bounding outlet 94, as denoted by arrow Z, for adjusting the direction or angle of attack of air flows B1 and B2, rotation in the clockwise direction directing more of the air flow into flow B1 toward the passage 86, and rotation in the counterclockwise direction directing more toward space 78 as flow B2. A more clockwise rotational position will also cause air flow B1 to have a lower angle of attack, or even a zero or negative angle of attack, relative to conveyor 52, which may be desirable under conditions, e.g., where attached husks are more prevalent, whereas a more counterclockwise rotational position will direct air flow B1 more toward the upper end of the conveyor for a steeper angle of attack, which may be desired to create more agitation of residue flow A. This can give a greater shearing effect to flow B2, which can effect cleaning, as well as the distance that conveyor 52 will propel flow A1.

As illustrated in FIG. 11, cover panels 122 and 124 of housing 80 disposed above conveyor 52 are hinged at their upper ends, to allow upward and downward positioning mostly of panel 122, as denoted by arrow E, to enable adjusting the size of first opening 84 (FIGS. 5-9) as desired or required for a particular application.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A corn cob cleaning system, comprising:
   a corn residue conveyor system including at least one inclined conveyor having a lower first end configured and positioned for receiving a flow of corn residue including cobs mixed with other material, an opposite second end disposed higher than the first end and adjacent to a space, and a movable, upwardly facing surface extending between the first end and the second end and configured for carrying the flow of corn residue, the inclined conveyor including a cover disposed over at least a substantial portion of the upwardly facing surface defining a passage thereover extending between a first opening adjacent to the first end of the inclined conveyor and a second opening adjacent to the second end of the conveyor, the inclined conveyor being operable for moving the upwardly facing surface for carrying the flow of corn residue upwardly through the passage to the second end and propelling the flow of residue away from the inclined conveyor and into the space, wherein the inclined conveyor is pivotably rotatable about the first end to adjust an angle of inclination of the conveyor, and further wherein the conveyor is operable to control the speed of movement of the upwardly facing surface, such that varying the combination of angle of inclination and speed of the upward facing surface determines the propulsion distance and the trajectory of the residue into the space;
   a fan adjustable mounted on the cover and disposed generally above the space, configured to operate to generate a first flow of air downwardly through the passage, and a second flow of air downwardly through the space, so as to remove at least some of the other material from the cobs, and wherein the first flow of air will carry the material removed thereby downwardly through the passage over the upward flow of corn residue therethrough and outwardly from the passage through the first opening, and the second flow of air will carry the material removed thereby downwardly through the space away from the cobs, wherein the fan orientation is adjustable for at least one of horizontal, vertical and rotational movement relative to the second end of the inclined conveyor, such that adjusting the at least one of horizontal, vertical and angular orientation of the fan increases or decreases the first flow of air downwardly through the passage, and similarly increases or decreases the second flow of air downwardly through the space.

2. The system of claim 1, further comprising a cob collection device disposed across the space from the second end of the inclined conveyor and including an internal chamber configured for receiving the cobs.

3. The system of claim 2, wherein the cob collection device and the at least one inclined conveyor are carried on a trailer configured to be towed by a corn harvester.

4. The system of claim 1, comprising a conveyor disposed adjacent to the first opening and configured for delivering the flow of corn residue to the at least one inclined conveyor across a gap therebetween, and wherein the first flow of air will be directed through the gap for removing at least some of the other material from the cobs.

5. The system of claim 4, wherein the conveyor disposed adjacent to the first opening is configured to be adjustably movable for altering flow of the removed material outwardly through the first opening.

6. The system of claim 5, wherein the conveyor disposed adjacent to the first opening is adjustably movable upwardly and downwardly relative to the first opening.

7. The system of claim 1, wherein the cover is movable relative to the inclined conveyor.

8. The system of claim 1, wherein the fan is adjustably mounted to the cover by a positioning plate, wherein the positioning plate has at least one of a horizontal slot, a vertical slot and a arcuate slot through which pins attached to the fan are received and adjustably fixed in position.

9. The system of claim 8, wherein when the fan is adjusted upwardly with respect to the positioning plate, the direction of the first flow of air is raised relative to the upwardly facing surface so that the first flow of air is substantially laminar with the upwardly facing surface causing less agitation along the upwardly facing surface and subsequently less cob loss.

10. The system of claim 8, wherein when the fan is adjusted downwardly with respect to the positioning plate, the direction of the first flow of air is lowered relative to the upwardly facing surface so that the interaction of the first flow of air with the upwardly facing surface is increased causing more agitation among the residue.

11. The system of claim 8, wherein when the fan is rotated with respect to the positioning plate, the direction of the angle of attack of the first and second flows of air, with respect to the passage and the space, will be adjusted.

12. The system of claim 11, wherein when the fan is rotated clockwise with respect to the positioning plate, the first and second flows of air will combine to generate an air flow output directed toward the passage, thereby increasing the air flow output through the passage.

13. The system of claim 11, wherein when the fan is rotated counterclockwise with respect to the positioning plate, the first and second flows of air will combine to generate an air flow output directed toward the passage, thereby increasing the air flow output through the space.

14. A corn cob cleaning system, comprising:
a conveyor system for receiving and conveying a flow of corn residue including a mix of cobs and other residue, including a series of conveyors including at least one conveyor disposed and configured for conveying the flow of residue through a gap to a first end of at least one inclined conveyor having an opposite second end higher than the first end and located adjacent to a space, the inclined conveyor having a movable, upwardly facing surface extending between the first end and the second end and configured for carrying the flow of corn residue;
a housing enclosing the inclined conveyor and defining a passage over at least a substantial portion of the upwardly facing surface extending between a first opening adjacent to the first end of the inclined conveyor and a second opening adjacent to the second end of the conveyor, the inclined conveyor being operable for moving the upwardly facing surface through the passage for carrying the flow of corn residue upwardly to the second end and propelling the flow of residue outwardly in an airborne manner from the second end into the space, wherein the inclined conveyor is pivotably rotatable about the first end to adjust an angle of inclination of the conveyor to vary the size of the second opening;
a fan adjustably mounted to the housing and disposed generally above the second end of the conveyor, configured to operate to generate a flow of air downwardly through the passage and the gap for removing at least some of the other material from the cobs and carrying the removed material outwardly through the first opening and the gap, wherein the fan orientation is adjustable for at least one of horizontal, vertical and rotational movement relative to the second end of the inclined conveyor, such that adjusting the at least one of horizontal, vertical and angular orientation of the fan increases or decreases the first flow of air downwardly through the passage, and similarly increases or decreases the second flow of air downwardly through the space.

15. The system of claim 14, further comprising a cob collection device disposed across the space from the second end of the inclined conveyor and including an internal chamber configured for receiving the cobs.

16. The system of claim 15, wherein the cob collection device and the at least one inclined conveyor are carried on a trailer configured for towing by a corn harvester.

17. A corn cob cleaning system for towing behind a corn harvesting machine, comprising:
a trailer carrying a cob collection device including an upstanding waif structure bounding an interior chamber;
a corn residue conveyor system carried on the trailer and including at least one inclined conveyor having a lower first end configured and positioned for receiving a flow of corn residue including cobs mixed with other material from a harvesting machine connected in towing relation to the trailer, an opposite second end disposed higher than the first end and across a space from an opening of the cob collection device in connection with the interior chamber, the inclined conveyor having a movable, upwardly facing surface extending between the first end and the second end and configured for carrying the flow of corn residue, a cover disposed over at least a substantial portion of the upwardly facing surface defining a passage thereover extending between a first opening adjacent to the first end of the inclined conveyor and a second opening in connection with the space, the inclined conveyor being operable for moving the upwardly facing surface for carrying the flow of corn residue upwardly through the passage to the second end and propelling the flow of residue away from the inclined conveyor airborne into the space, wherein the inclined conveyor is pivotably rotatable about the first end to adjust an angle of inclination of the conveyor to vary the size of the passage;
a fan adjustably mounted to the cover and disposed generally above the space, configured to operate to generate a first flow of air downwardly through the passage and outwardly therefrom through the first opening for removing some of the other material from the crop residue carried by the inclined conveyor, and wherein the operation of the fan will generate a second flow of air downwardly through the airborne flow of residue for removing at least some of the remaining other material from the cobs, wherein the fan orientation is adjustable for at least one of horizontal, vertical and rotational movement relative to the second end of the inclined conveyor, such that adjusting the at least one of horizontal vertical, and angular orientation of the fan increases or decreases the first flow of air downwardly through the passage, and similarly increases or decreases the second flow of air downwardly through the space.

18. The system of claim 17, wherein the conveyor system further comprises a conveyor disposed adjacent to the first opening and configured for delivering the flow of corn residue across a gap to the at least one inclined conveyor, and such that a portion of the first flow of air will pass through the gap for removing at least some of the other material from the flow of corn residue thereacross.

* * * * *